No. 648,989. Patented May 8, 1900.
LA VERNE W. NOYES.
WATER SUPPLY REGULATOR FOR WINDMILLS.
(Application filed Nov. 14, 1898.)
(No Model.)
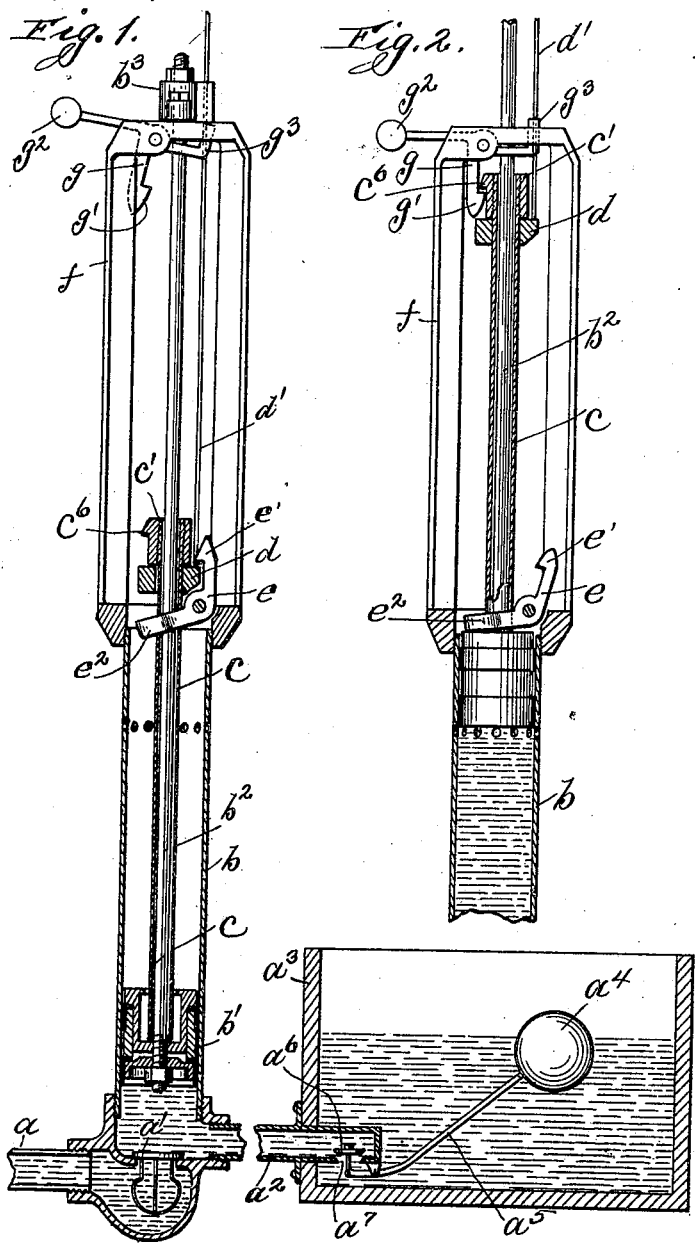
Witnesses:
W. J. Jacker,
M. R. Rochford
Inventor:
La Verne W. Noyes
By Ludington & Jones
Attorneys.

UNITED STATES PATENT OFFICE.

LA VERNE W. NOYES, OF CHICAGO, ILLINOIS.

WATER-SUPPLY REGULATOR FOR WINDMILLS.

SPECIFICATION forming part of Letters Patent No. 648,989, dated May 8, 1900.

Application filed November 14, 1898. Serial No. 696,373. (No model.)

*To all whom it may concern:*

Be it known that I, LA VERNE W. NOYES, a citizen of the United States, residing at Chicago, in the county of Cook and State of Illinois, have invented a certain new and useful Improvement in Water-Supply Regulators for Windmills, of which the following is a full, clear, concise, and exact description, reference being had to the accompanying drawings, forming a part of this specification.

My invention relates to a water-supply regulator for windmills, my object being to provide a regulator for throwing the windmill into and out of operation which is so arranged that the mill will be thrown completely out of the wind when the water-supply reaches the maximum and will be completely thrown into the wind when the water-supply reaches the minimum.

In an application filed of even date herewith, Serial No. 696,372, I have described and generically claimed a form of windmill-regulator wherein a member is adapted to be moved in one direction through the agency of motion derived from the windmill, a furling device being provided which is locked in position during the travel of said member and released as the member nears the end of its travel to thus permit the mill to be thrown out of operation. Means such as a weight is provided for moving the member and the furling device in the opposite direction, the release of said member being controlled by the float in the tank or reservoir. The present invention relates to a specific embodiment of the general form of invention above described wherein the movement of the member is accomplished through the agency of the pressure of the water supplied by the pump, which is driven by the windmill to be controlled.

In accordance with the present invention a piston is provided adapted to be moved by means of the pressure of the water supplied to the tank as the water in the tank approaches the maximum level. The piston acts as it approaches the end of its travel to release the furling device and permit the windmill to be thrown completely out of the wind. A weight or similar device is provided for moving the furling device in the opposite direction to throw the windmill into the wind, the release of said weight being controlled by the float in the tank.

I have illustrated my invention in the accompanying drawings in which—

Figure 1 is a view of the regulator, the lower part thereof being shown in section. Fig. 2 is a similar view showing the parts in an alternative position. Fig. 3 is a view looking at right angles to the position shown in Fig. 1.

Like letters refer to like parts in the several figures.

The pipe $a$ is connected with the pump, and the water passes therefrom through the valve $a'$, which is raised by the pressure of the water from beneath, the water then passing through the pipe $a^2$ to the reservoir $a^3$ or other place of storage for the water. In the tank is provided a float $a^4$, mounted upon a rod $a^5$, which controls a valve $a^6$ to open and close the port $a^7$, by means of which the pipe $a^2$ communicates with the reservoir. In communication with the pipe $a^2$ is a cylinder $b$, within which moves a piston $b'$, the piston being mounted upon the lower end of a rod $b^2$, the upper end of which is secured to a cross-piece $b^3$, at the opposite ends of which are secured the rods $b^4$ $b^4$, extending downward and carrying upon the lower ends the weights $b^5$ $b^5$, which are illustrated as having an annular form. Surrounding the piston-rod $b^2$ is a hollow pipe or sleeve $c$, the upper end of which carries a cross-piece $c'$, to which are attached the upper ends of the rods $c^2$ $c^2$, which extend downward and support the cross-piece $c^3$, which in turn supports the weight $c^4$. A coiled spring $c^5$ is interposed between the cross-piece $c^3$ and the weight $c^4$ to take up any shock which would otherwise be exerted by the weight $c^4$ as the same falls, as hereinafter described. Surrounding the sleeve $c$ is a ring $d$, to which the lower end of the furling-wire $d'$ is attached, the ring $d$ carrying arms $d^2$ $d^2$, through which the rods $c^2$ $c^2$ pass, thus holding said ring against rotation. The rods $b^4$ $b^4$, attached to the cross-piece $b^3$, pass through the ends of cross-piece $c'$, whereby the said cross-pieces are held against relative rotation. The furling-wire $d'$ is connected with the furling mechanism of the mill and in the specific form of regulator shown in the drawings is adapted for a mill arranged to be thrown into the wind when the furling-wire is pulled downward and to be thrown out of the wind when the furling-wire is moved upward. A dog $e'$ provided upon the end of the pivoted lever $e$ normally engages the ring $d$ to hold the same in its lowermost position. The lever $e$ carries an arm $e^2$, which rests in the path of the piston $b'$, whereby said piston engages the arm at the upper end of its travel and rocks the lever $e$ upon its pivot to disengage the ring $d$. At the upper end of the bracket $f$, which guides the movement of the upper end of the piston-rod $b^2$, a pivoted lever $g$ is provided, carrying upon the end a dog $g'$, adapted to engage and hold the ring $d$ when said ring is moved into its upper position. A weight $g^2$ is provided upon an arm of the lever $g$ to hold the dog $g'$ in position, and an arm $g^3$ is provided upon said lever adapted to lie in the path of cross-piece $b^3$ as the same descends, whereby said cross-piece engages arm $g^3$ to rock lever $g$ and move dog $g'$ out of engagement with ring $d$.

The operation of the regulator is as follows: During the time the windmill is in normal operation, pumping water through pipes $a$ $a^2$ into the reservoir $a^3$, the piston $b'$ is at the lower end of its travel and the several parts of the mechanism are as illustrated in Fig. 1. As the water rises in the reservoir the float $a^4$ is raised, and when the water-level has reached the maximum predetermined level the valve $a^6$ gradually closes port $a^7$. The piston $b'$ is thus subjected to an increased pressure, due to the inflowing water which cannot pass into the reservoir, and the piston is thus raised, thereby lifting the cross-piece $b^3$ and the weights $b^5$ $b^5$ carried thereby. The sleeve $c$, resting against the face of piston $b'$, is also moved upward, thereby raising the cross-piece $c'$ and the weight $c^4$ supported thereby. The dog $e'$, engaging ring $d$, to which the furling-wire is attached, maintains said ring in its lower position. When the piston $b'$ has approached the upper end of its travel, lug $c^6$ on the ring $c'$ is engaged by the dog $g'$ on the lever $g$, and as piston $b'$ reaches the upper end of its travel it engages the arm $e^2$ and rocks the lever $e$, thereby moving the dog $e'$ out of engagement with ring $d$ and permitting the same to move upward to throw the windmill out of operation, the ring $d$ moving upward until it engages cross-piece $c'$. The windmill thus continues in operation until the furling wire or rod is released, when the mill is thrown completely and instantaneously out of operation. As the water-level in the reservoir $a^3$ lowers the float $a^4$ descends and raises the valve $a^6$ to open the port $a^7$. The weights $b^5$, acting through the cross-piece $b^3$ and piston-rod $b^2$, cause the piston $b'$ to descend, forcing the water beneath the same through the pipe $a^2$ into the reservoir. The cross-piece $c'$ and the weights $c^4$ supported thereby are held in the upper position, due to the engagement of the dog $g'$.

When the piston $b'$ and the cross-head $b^3$ approach the lower end of their travel, the cross-head $b^3$ engages arm $g^3$ and rocks the lever $g$ to disengage the dog $g'$ from the lug $c^6$ on the cross-piece $c'$, and said cross-piece is thus released, and the weight $c^4$ causes the same to descend, carrying the ring $d$ downward, exerting the pull upon the furling-wire $d'$ to move the windmill into the wind and to throw the same into operation, thereby starting the pump into action. The regulator thus acts to alternately throw the windmill into and out of gear, according as the water in the reservoir falls below a predetermined lower level or rises above a predetermined higher level, the windmill being thrown completely into and out of operation without being left in any intermediate position, as is frequently the case with regulators of the prior art, it being the special object of the present invention to provide a structure which will effectually perform its function of unfailingly throwing the windmill completely into and out of operation.

Near the upper end of the cylinder $b$ a series of openings or ports $b^7$ $b^7$ is provided, whereby when the piston $b'$ reaches the upper end of its travel, as shown in Fig. 2, the ports will be in communication with the portion of the cylinder beneath the piston to permit the escape of any excessive water within the cylinder. Should the mill for any reason continue to operate for a short period after the piston reaches the upper end of its travel, thereby forcing water into the cylinder $b$, due to the continued operation of the pump, the water would find free escape through the port $b^7$, and injury to the apparatus would thus be avoided.

Having described my invention, what I claim as new, and desire to secure by Letters Patent, is—

1. In a water-supply regulator for windmills, the combination with a movable member thereof, of means for moving the same in one direction by hydraulic pressure derived from the operation of the windmill, a part connected with the furling device of the windmill, a lock for holding the same during such movement of said member and released at a predetermined point in the travel thereof, means for automatically returning said movable member to the initial position, said movable member being arranged to engage and move the part connected with the furling device to the initial position during the return stroke of said movable member, substantially as described.

2. In a water-supply regulator for windmills, the combination with a movable member thereof, of means for moving the same in one direction by hydraulic pressure derived from the operation of the windmill, a part connected with the furling device of the windmill and a lock for holding the same during the movement of said member and released at a predetermined point in the travel thereof, and means for automatically moving said member and the part connected with the furling device to the initial position, substantially as described.

3. In a water-supply regulator for windmills, the combination with a movable member thereof, of means for moving the same in one direction by hydraulic pressure derived from the operation of the windmill, a part connected with the furling device of the windmill, and a lock for holding the same during the movement of said member and released at a predetermined point in the travel thereof, means as a weight for moving said member and the part connected with the furling device to the initial position, and a controller, as a float, responsive to the change of the level in the reservoir for controlling the movement of said member, substantially as described.

4. In a water-supply regulator for windmills, the combination with a movable member thereof, of means for moving the same in one direction by motion derived from the operation of the windmill a part connected with the furling device of the windmill and locked during the movement of said member and released at a predetermined point in the travel thereof, means, as a weight, for moving said member and the part connected with the furling device to the initial position, a lock for holding said part connected with the furling device in the position to which the same is moved, and a controller, as a float, responsive to the change of the level in the reservoir for releasing said lock, substantially as described.

5. In a water-supply regulator for windmills, the combination with a movable member thereof, of means for moving the same in one direction by hydraulic pressure derived from the operation of the windmill, a float or other device responsive to the change of level in the reservoir arranged to throw said means into operation as the float approaches its upper limit, a part connected with the furling device of the windmill and a lock for holding the same during such movement of said member and released at a predetermined point in the travel thereof, means, as a weight, for moving said member and part connected with the furling device to their initial positions when released, and a lock for holding said means or weight in position until released, said float being arranged to effect the release of said last-mentioned lock as the float approaches the lower limit, substantially as described.

6. The combination with a cylinder communicating with the tank or reservoir, of a piston moving in said cylinder, a float in said tank, a valve interposed in the communication between the cylinder and the tank and controlled by said float, a part connected with the furling device of the windmill and a lock for holding the same during the movement of said piston and released thereby near the end of the travel thereof, and means, as a weight, for moving the part connected with the furling device to the initial position, substantially as described.

7. In combination, a cylinder communicating with the tank or reservoir, a piston in said cylinder moved in one direction by hydraulic pressure, a valve interposed between the cylinder and the tank, a float in said tank for controlling said valve, a part connected with the furling device of the windmill, a lock for holding the same during said movement of said piston in one direction, and released thereby near the end of the travel thereof, means, as a weight, for returning said part to the initial position, and a second lock for holding said means in position until released, said second lock being arranged to be released as the piston approaches its initial position, substantially as described.

8. In a water-supply regulator for windmills, the combination with a cylinder and a weighted piston moving therein, of a part connected with the furling device of the windmill, a lock for holding the said part at the lower end of its travel, means for releasing said lock when the piston approaches the upper end of its travel, a weight so connected with said part as to cause the same to descend when the weight is released, a second lock for holding said weight in an elevated position and means for releasing said second lock when the piston reaches the lower end of its travel, substantially as described.

9. In a water-supply regulator for windmills, the combination with a cylinder and a weighted piston moving therein, of a part connected with the furling device of the windmill, a lock for holding the said part at the lower end of its travel, means for releasing said lock when the piston approaches the upper end of its travel, a weight so connected with said part as to cause the same to descend when the weight is released, a lock for holding said weight in position until released, means for releasing said lock when the piston reaches the lower end of its travel, a float, and a valve controlled thereby for controlling the movement of said piston, substantially as described.

10. In a water-supply regulator for windmills, the combination with a cylinder and a weighted piston moving therein, of a weighted sleeve surrounding the piston-rod of said piston, and raised when the piston ascends, a part connected with the furling device of the windmill, a lock for holding the said part at the lower end of its travel, means for releasing said lock when the piston approaches the upper end of its travel, a lock for holding said weighted sleeve at the upper end of its travel, and means for releasing said lock when the piston reaches the lower end of its travel, substantially as described.

11. In a water-supply regulator for windmills, the combination with the cylinder communicating with the tank and with the supply-pipe, of a valve interposed between the cylinder and said tank, a float for controlling said valve and the piston in said cylinder, a cross-piece supported upon the upper end of the piston-rod of said piston, a weight suspended therefrom, a sleeve surrounding said piston-rod, a cross-piece supported upon the upper end thereof, a weight suspended therefrom, a part connected with the furling device of the windmill, a lock for holding the same in its lower position, said lock being arranged to be engaged by the piston in its upper position to release the part connected with the furling device, a lock for holding the cross-piece on said sleeve in the upper position and arranged to be engaged by the cross-piece upon the upper end of the piston-rod as said said cross-piece reaches the lower end of its travel, substantially as described.

In witness whereof I have hereunto subscribed my name in the presence of two witnesses.

LA VERNE W. NOYES.

Witnesses:
W. CLYDE JONES,
M. R. ROCHFORD.